United States Patent
Rosenbush

(10) Patent No.: US 8,788,633 B2
(45) Date of Patent: Jul. 22, 2014

(54) LOW BANDWIDTH REMOTE CONTROL OF AN ELECTRONIC DEVICE

(75) Inventor: David Rosenbush, Simsburt, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 1064 days.

(21) Appl. No.: 11/194,984

(22) Filed: Aug. 2, 2005

(65) Prior Publication Data
US 2007/0033238 A1 Feb. 8, 2007

(51) Int. Cl.
G06F 17/30 (2006.01)

(52) U.S. Cl.
USPC .......................................... 709/221

(58) Field of Classification Search
USPC ............................ 463/42; 709/221
See application file for complete search history.

(56) References Cited

U.S. PATENT DOCUMENTS

| | | | |
|---|---|---|---|
| 5,909,545 A * | 6/1999 | Frese et al. ................ | 709/208 |
| 6,754,710 B1 | 6/2004 | McAlear | |
| 6,760,017 B1 | 7/2004 | Banerjee | |
| 2001/0056464 A1* | 12/2001 | Ishihara et al. ............ | 709/203 |
| 2003/0093632 A1* | 5/2003 | Osborne ...................... | 711/154 |
| 2003/0198225 A1* | 10/2003 | Mononen ..................... | 370/392 |
| 2003/0217123 A1 | 11/2003 | Anderson | |
| 2004/0122964 A1* | 6/2004 | Teh ............................. | 709/230 |
| 2004/0224774 A1* | 11/2004 | Nakai ......................... | 463/42 |
| 2005/0113158 A1* | 5/2005 | Sterchi et al. ............... | 463/3 |
| 2005/0181877 A1* | 8/2005 | Kuwahara et al. .......... | 463/42 |
| 2006/0106963 A1* | 5/2006 | Sasaki et al. ................ | 710/110 |
| 2006/0116796 A1* | 6/2006 | Fossen et al. ............... | 701/21 |

OTHER PUBLICATIONS

Article entitled "Nintendo DS Instruction Booklet", dated Mar. 22, 2005, by Nintendo.*
Article entitled "Nintendo DS Launches in the US" by IGN, dated Nov. 21, 2004.*
Article entitled "E3 2004: Nintendo's DS Booth Presentation" by Harris, dated May 12, 2004.*
Article entitled "Classic NES Series Wireless in Action", by Harris, dated Jun. 9, 2004.*
Article entitled "HMP 2004 Multimedia—Image Gallery Photo Report—Jul. 28, 2004" by NASA, dated Jul. 28, 2004.*
Article entitled "HMP 2004 Multimedia—Image Gallery Photo Report—Jul. 31, 2004" by NASA, dated Jul. 31, 2004.*
Article entitled "Elaine Walkers Personal Journal—HMP 2004 Education and Public Outreach", by NASA, dated Jul. 31, 2004.*
Article entitled "Nintendo's Handheld TimeLine" by Stein, dated Jun. 25, 2011.*

(Continued)

Primary Examiner — Mahesh Dwivedi
(74) Attorney, Agent, or Firm — Carlson, Gaskey & Olds P.C.

(57) ABSTRACT

An arrangement for controlling remote devices includes two networked computers. The first computer displays a first file that is stored on the first computer and the second computer displays a second file that is stored on the second computer. The computers send non-graphical commands back and forth to page up or down, zoom, or pan the displayed files in response to commands input into either of the computers. This allows an operator at either computer to view output corresponding to the commands input into the other computer. The first and second files are essentially the same and are retained on the respective computers, so there is no need to send relatively large graphical data packets over the network. Use of relatively small non-graphical data packets reduces the network bandwidth used.

8 Claims, 1 Drawing Sheet

(56) References Cited

OTHER PUBLICATIONS

Article entitled "Nintendo DSi XL Operations Manual" by Nintendo, dated Mar. 24, 2010.*
Article entitled "Nintendo DSi Operations Manual" by Nintendo, dated Jun. 18, 2009.*
Article entitled "Nintendo DS Lite Instruction Booklet" by Nintendo, dated May 26, 2006.*
Article entitled "DATE" by Nintendo, dated Nov. 17, 2004.*
Article entitled "Nintendo DS Instruction Booklet" by Nintendo, dated Nov. 17, 2004.*
Article entitled "Devon Island" by Mars-Frontier, dated Aug. 2, 2004.*
Article entitled "Investigation of EVA Information Interface Technology in a Mars Analog Artic Field Science Setting" by Boucher et al., dated 2002.*
Article entitled "Game Boy Advance Wireless Adapter FAQ" by ArsonWinter, dated Sep. 2, 2005.*

* cited by examiner

LOW BANDWIDTH REMOTE CONTROL OF AN ELECTRONIC DEVICE

BACKGROUND OF THE INVENTION

This invention relates to control of remote devices and, more particularly, to an arrangement that reduces the amount of network bandwidth used to remotely control the devices.

Conventional arrangements for controlling remote devices such as computers are widely known and used. One typical arrangement is used for communication between an outer space base station and an astronaut explorer. In a typical mission, the astronaut explorer performs various tasks outside of the base station while wearing a space suit. The tasks, such as operating complex instruments, performing intricate geological analysis, or repairing the space station, often require the astronaut explorer to follow complicated instructions. During such missions, the astronaut explorer often utilizes a computer that contains instructions, pictures, etc. to help complete the tasks.

The space suit prevents the explorer astronaut from easily manipulating the computer to access the instructions, pictures, or other files. To circumvent this problem, the computer is connected through a network to a base station computer. An assistant located in the base station remotely controls the astronaut explorer's computer to display and manipulate instructions, pictures, etc. to help the astronaut explorer complete the tasks. The instructions, graphics, and control (e.g., commands, such as to zoom in on a selected portion of a picture) are sent over the network from the base station computer to the astronaut explorer's computer.

Disadvantageously, the instructions, pictures, and commands sent over the network and displayed on the astronaut explorer's computer often use a significant amount of available network bandwidth. The base station computer continually updates the graphical display on the astronaut explorer's computer such that the network is constantly sending large amounts of data. This provides the advantage of the assistant and the astronaut explorer being able to view the same instructions and pictures at the same time as they cooperate to complete the tasks, however, the relatively large amount of network bandwidth used to continually refresh to astronaut explorer's computer places a large demand on the network and may prevent other functions from using the network.

Accordingly, there is a need for an arrangement that avoids continually sending large amounts of data over a network to reduce the amount of bandwidth used. This invention addresses this need and further provides enhanced capabilities while avoiding the shortcomings and drawbacks of the prior art.

SUMMARY OF THE INVENTION

The arrangement for controlling remote devices according to the present invention includes a first device that displays a first file and a second device that is in communication with the first device. The second device displays a second file that is essentially the same as the first file. The first and second devices each produce an output on the respective displays of the first and second files in response to a command input into either of said first or second devices. This allows an operator at either device to view output corresponding to commands input into the other device.

A method of controlling remote devices includes the step of displaying an output on a first display of a first file and a second display of a second file in response to entering a command into either one of a first or second device. The first and second files are essentially the same and are retained on the respective computers to reduce the size of data packets sent between the devices to display the output.

A second method of controlling remote devices includes the step of sending a network packet of instructions consisting of non-graphical data between first and second devices to display an output that corresponds to the non-graphical data on a display of a first file on the first device and a display of a second file on a second device in real time. The first and second files are essentially the same and are retained on the respective computers, so there is no need to send relatively large graphical data packets between the devices.

Accordingly, an arrangement of remote control devices according to the present invention communicate non-graphical commands back and forth to display similar outputs, such as movement of a pointer, paging up or down, or typing from a keyboard, on each of the remote control devices in real time. Sending non-graphical commands instead of large amounts of graphical data to continually refresh the displays reduces the amount of network bandwidth used.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
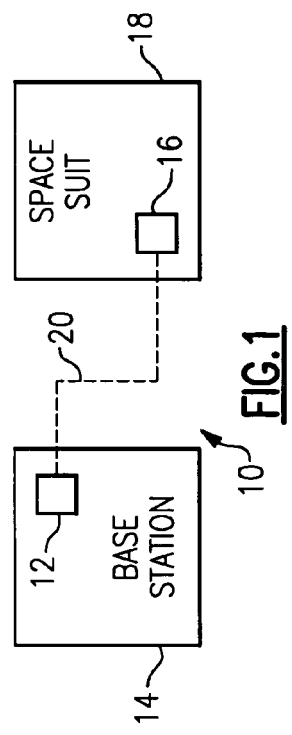
FIG. 1 is a schematic view of an example arrangement for remote control devices.

FIG. 1 illustrates selected portions of an example arrangement 10 for controlling remote devices, such as computers. In this example, a base station computer 12 is located in a base station 14 (shown schematically) and an astronaut computer 16 is associated with a space suit 18 (shown schematically). A network 20 connects the base station computer 12 and the astronaut computer 16 and provides for communication between the two computers. The base station computer 12 and the astronaut computer 16 are configured to mimic each other such that commands entered into and displayed on either one of the base station computer 12 or the astronaut computer 16 are displayed in real time on the other, as will be described below.

The arrangement 10 utilizes a relatively small amount of network bandwidth. Network packets sent back and forth between the base station computer 12 and the astronaut computer 16 contain a relatively small amount of data compared to large packets utilized in previously known arrangements. The network packets utilized by the arrangement 10 are non-graphical, whereas previously known arrangements contain graphical information for continually refreshing a display screen and therefore occupy a relatively large bandwidth.

Figure 2:
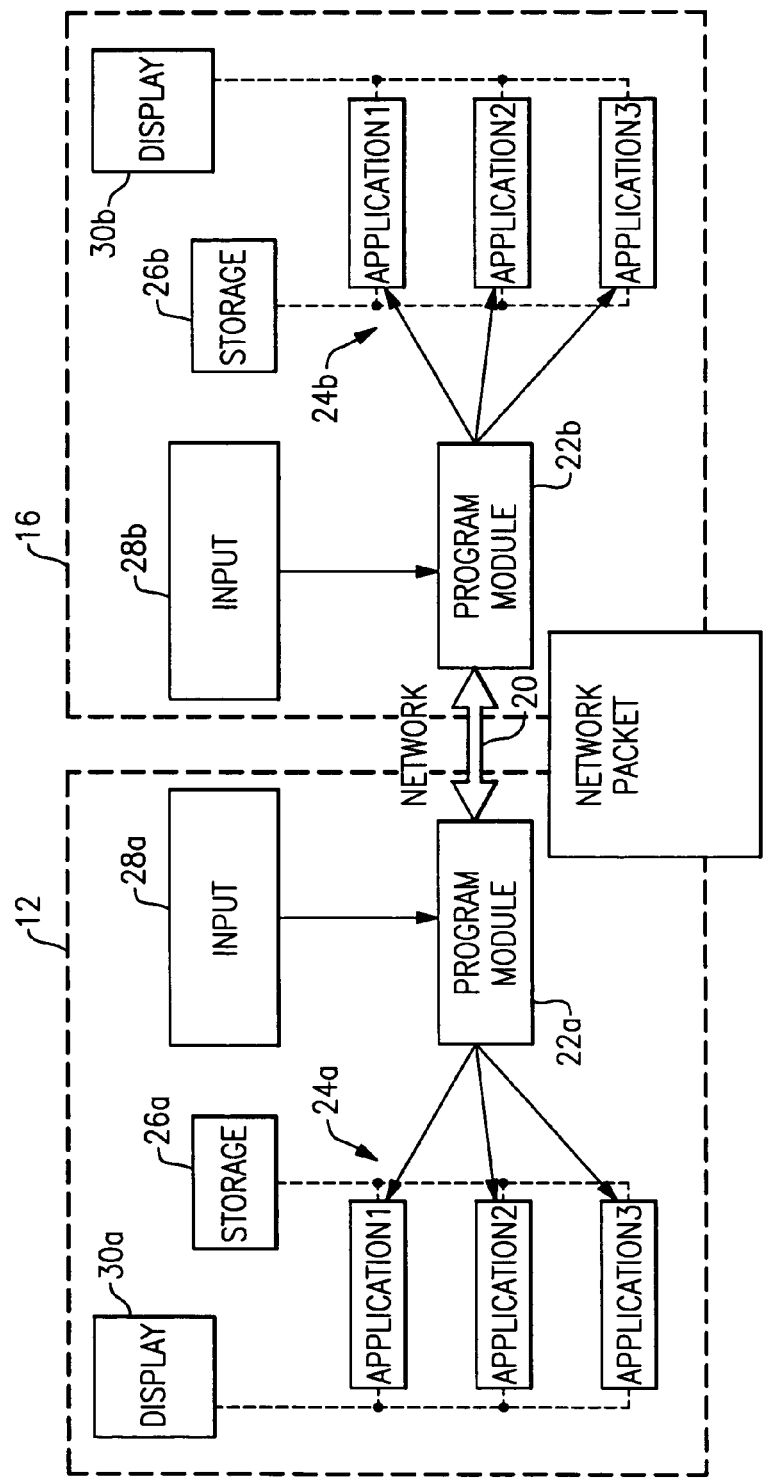
FIG. 2 is a schematic view of the operation of the example arrangement for remote control devices.

Referring to FIG. 2, the base station computer 12 and astronaut computer respectively include program modules 22a and 22b, a plurality of application modules 24a and 24b, electronic storage portions 26a and 26b, user inputs 28a and 28b such as a keyboard or mouse, and display portions 30a and 30b such as a monitor or screen for displaying files stored in the storage portions 26a and 26b. The term "module" as used in this description refers to hardware and software for processing information.

During operation of the arrangement 10, such as during a space mission, a base station operator in the base station 14 activates the program module 22a using commonly known methods of opening electronic or computer program modules. This opens a program module window on the display portion 30a, for example, through which the operator activates a selected first file to be opened by a selected first application module (e.g., a graphics viewer, a word processing program, etc.) from the plurality of application modules 24a. The display portion 30a displays the selected first file. In one example, the selected first file includes a graphic or document containing a set of instructions for assisting an astronaut in completing a task.

The network 20 connects the program modules 22a and 22b. Upon opening the program module 22a and opening the selected first file from the electronic storage portion 26a, the program module 22a sends a network packet to the program module 22b of the astronaut computer 16. The network packet includes instructions for the program module 22b to open a selected second application module and a selected second file. The selected second application module is the same type of application module as the selected first application module. That is, if the selected first application module is a graphics viewer, the selected second application module is a graphics viewer. The selected second file is essentially the same as the selected first file. In one example, the selected first file and the selected second file each contain the same graphic or the same document.

The network packet includes, for example, a remote device address of the astronaut computer 16 such as a known internet protocol address, an application module identification, an instruction to open the application module that corresponds to the application module identification, and a file identification. The application module identification identifies which selected second application module from the plurality of application modules 24b is to be used to display the second file.

The file identification identifies the second file. In one example, the selected second file is the same as the first selected file (e.g., the same document, picture, etc.). The program module 22b opens the selected second file using the selected second application module and displays it on the display portion 30b of the astronaut computer 16.

Alternatively, instead of sending the network packet with instruction to open the second file, an astronaut operator at the astronaut computer 16 opens the program module 22b and the selected second file to be opened by the selected second application module.

Once the selected first and second files are displayed on the respective display portions 30a and 30b, either the base station operator or the astronaut operator enters a command through the respective user inputs 28a or 28b. In one example, the base station operator desires to zoom in on a selected portion of a displayed graphic in order to show the astronaut operator more detail. Other desirable inputs include, but are not limited to, movement of a mouse to produce movement of a pointer or keystrokes on a keyboard.

In one illustrative example to show the operation of the arrangement 10, the base station operator utilizes the user input 28a to click on a zoom button displayed within the selected first application module. This produces a first output of zooming in on the selected portion. In response to this first input, the program module 22a produces a network packet that includes the remote device address, the application module identification, a command identification, and command data containing instructions to execute the command. The remote device address and application module identification are similar to as described above. The command identification indicates the type of command, such as zooming in or out, panning, and paging up or down, for example. The command data includes instructions for executing the command. The instructions are encoded to correspond to the type of application module. That is, the instructions include programming language that is compatible with the type of application module.

The program module 22a sends the network packet to the program module 22b. In response, the program module 22b commands the selected second application module to execute the instructions, which mimic the first output on the second display portion 30b. That is, the astronaut computer 16 mimics the first input, the command to zoom, from the base station operator. This occurs in real time such that there is virtually no delay between the first output on the display portions 30a and 30b. This provides the benefit of allowing the base station operator and the astronaut operator to nearly simultaneously view the same documents or graphics while cooperating to complete a relatively complex task.

Likewise, if the astronaut operator enters an input into the user input 28b, the program module 22b sends a network packet to the program module 22a to produce the output on the display portion 30a.

The feature of storing the first and second files in the respective storage portions 26a and 26b provides the benefit of eliminating the need to continually send display updates between the base station computer 12 and the astronaut computer 16, as for previously known arrangements. The first and second files are already respectively displayed on the computers 12 and 16, so there is no need to send large amounts of graphical data over the network to refresh the displays. The arrangement 10 conveniently sends non-graphical commands to control, zoom, page, pan, etc. back and forth between the computers 12 and 16, which occupy a relatively small amount of network bandwidth.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A system for control of remote devices comprising:
  a first device displaying a first file, said first device including a first program module, wherein said first device comprises a base station computer;
  a second device in communication with said first device, said second device displaying a second file that is essentially the same as the first file, said second device including a second program module, said first and second program modules in communication with each other, wherein said second device comprises a space suit computer, said space suit computer being a computer integrated into a space suit, said space suit computer adapted to receive commands from an astronaut wearing a space suit;
  said first and second devices each producing an output on said displays of said first and second files in response to a command input into either of said first or second devices, wherein, in response to receiving said command, one of said first and second program modules sends a network packet of instructions to the other of said first or second program module, wherein said network packet consists of non-graphical data;
  said first program module sending said command to said second program module when said first device receives said command, and said second program module sending said command to said first program module when said second device receives said command;

wherein said first device includes a plurality of application modules in communication with said first program module, and said second device includes a corresponding plurality of application modules in communication with said second program module; and wherein said first program module and said plurality of application modules are stored on said first device, and said second program module and said corresponding plurality of application modules are stored on said second device, before said one of said first and second program modules sends a network packet of instructions to the other of said first or second program module.

2. The system as recited in claim 1, wherein said first device includes a first storage portion storing said first file and said second device includes a second storage portion storing said second file.

3. The system as recited in claim 1, wherein said first device includes an application module in communication with said first program module and said second device includes a corresponding application module in communication with said second program module.

4. The system as recited in claim 1, wherein said first and second program modules encode said command based upon one of a plurality of possible codes that correspond to one of said plurality of application modules and one of said corresponding plurality of application modules.

5. The system as recited in claim 1, wherein said network packet of instructions includes a remote device address, an application module identification defining said application module, a command identification defining said command, and command data containing instructions to produce said output.

6. The system of claim 1, wherein the command is responsive to a keystroke from a keyboard or a movement of a mouse.

7. The system of claim 1, wherein the first program module is operable to command the second program module to open a document and to page up or down, zoom in or out, or pan the document, and wherein the second program module is operable to command the first program module to open a document and to page up or down, zoom in or out, or pan the document.

8. The system of claim 1, wherein said non-graphical data does not induce continual refreshing of either a display screen of said first device or a display screen of said second device.

* * * * *